Aug. 10, 1948.  L. D. CAHILL ET AL  2,446,632
AIR PRESSURE GAUGE

Filed Jan. 31, 1944  3 Sheets—Sheet 1

INVENTOR.
LYSLE D. CAHILL
BY VICTOR T. UBER

Frank H. Harmon
ATTORNEY

INVENTOR.
LYSLE D. CAHILL
BY VICTOR T. UBER

ATTORNEY

Aug. 10, 1948.    L. D. CAHILL ET AL    2,446,632
AIR PRESSURE GAUGE

Filed Jan. 31, 1944    3 Sheets-Sheet 3

INVENTOR.
LYSLE D. CAHILL
BY VICTOR T. UBER

Frank H. Harmon
ATTORNEY

Patented Aug. 10, 1948

2,446,632

UNITED STATES PATENT OFFICE 2,446,632

AIR PRESSURE GAUGE

Lysle D. Cahill, Shaker Heights, and Victor T. Uber, Willoughby, Ohio, assignors, by mesne assignments, to Jack & Heintz Precision Industries, Inc., Cleveland, Ohio, a corporation of Delaware Application January 31, 1944, Serial No. 520,434

5 Claims. (Cl. 73—410)

1

This invention relates to improvements in air gauges and has particular reference to the pressure responsive indicating mechanism in the air supply line of such a gauge wherein the diameter of a bore may be precisely measured by the accurate measurement of the pressure in said air line supplying air to a plug having a plurality of orifices and adapted to fit closely within a bore to be measured.

The general object of the invention is to provide a novel and improved sensitive pressure measuring and indicating mechanism for use in a system of the type referred to, and a further object is to provide means for adjusting the sensitivity and response of such a mechanism for different degrees of tolerance in bores being gauged.

Figure 1:
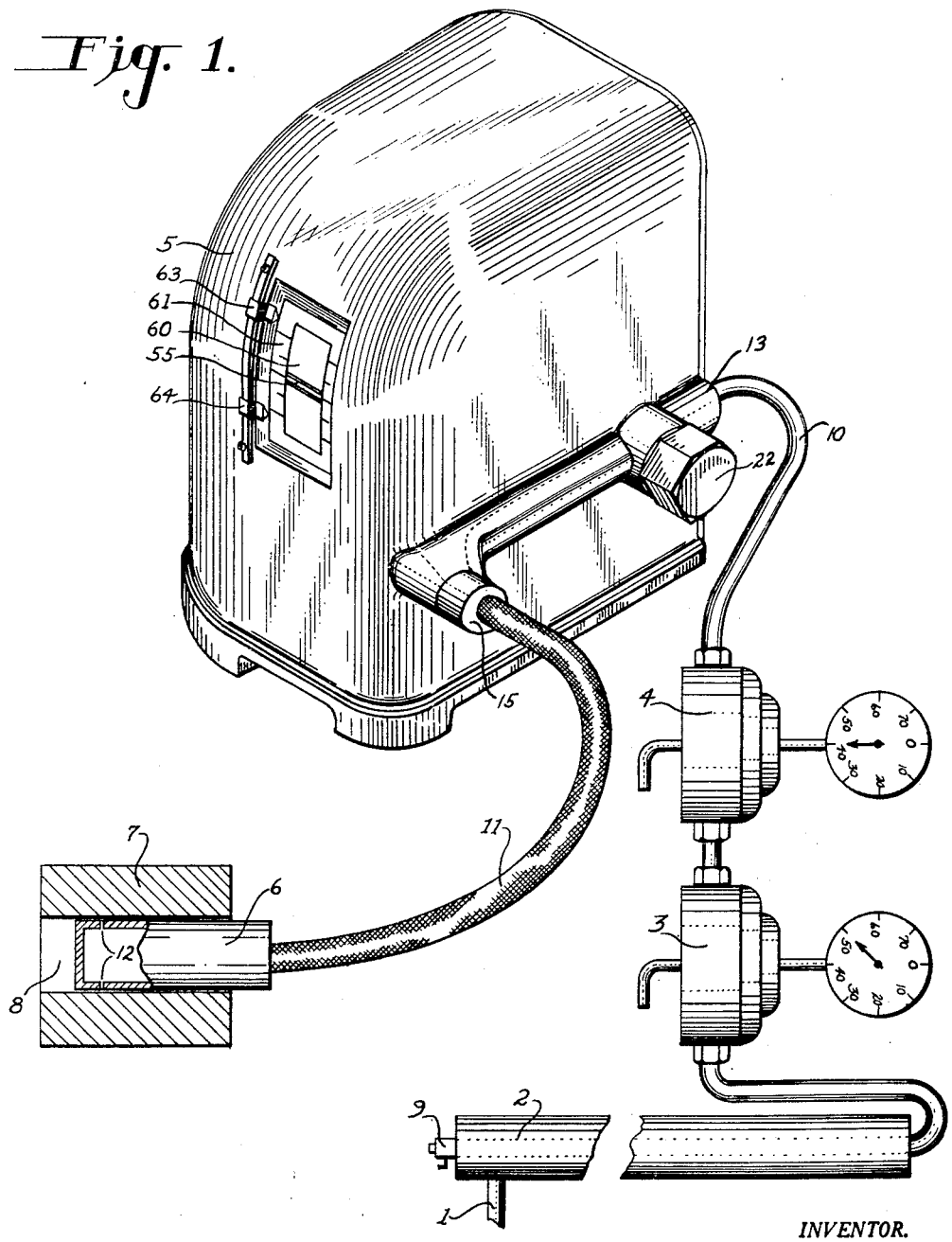
Figure 1 is a schematic view showing the principal elements of the system and showing the plug in position in a bore to be measured.
Figure 3:
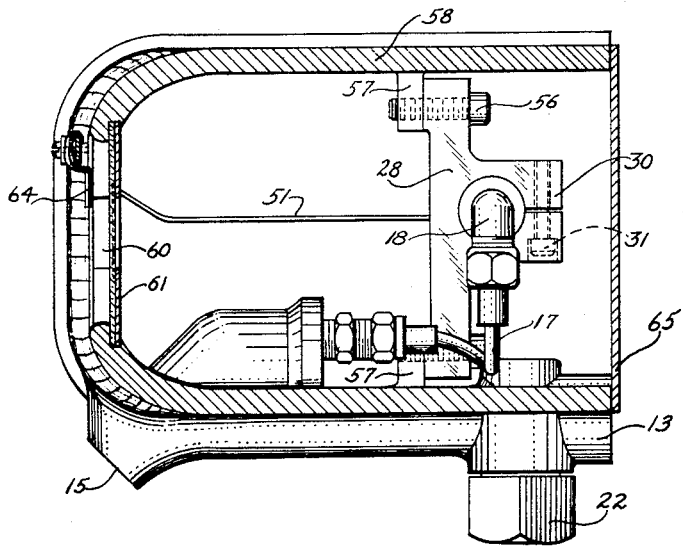
Figure 3 is a sectional view taken approximately on the line 3—3 of Figure 2.
Figure 2:
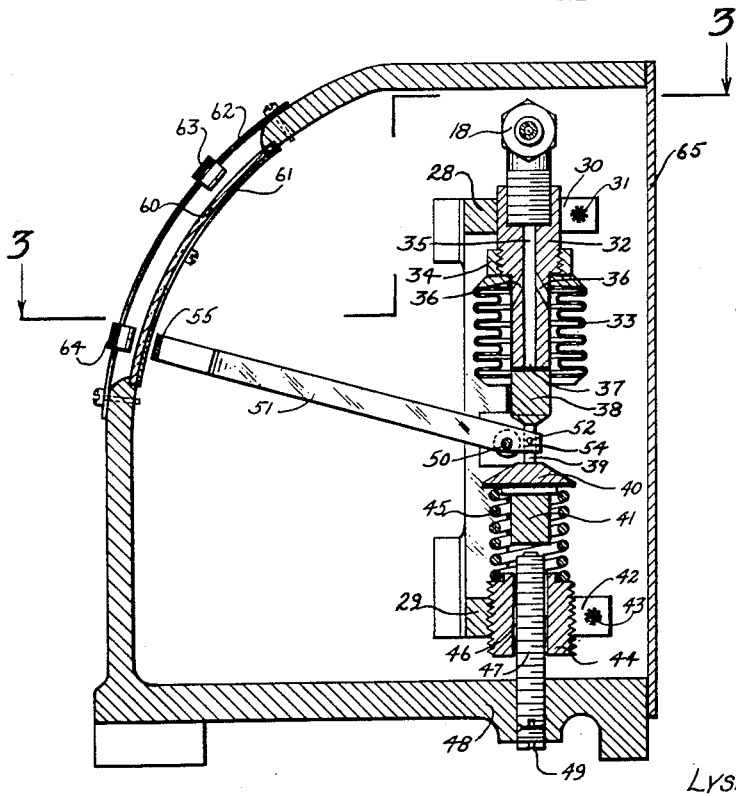
Figure 2 is a longitudinal sectional view through the indicating mechanism.
Figure 4:
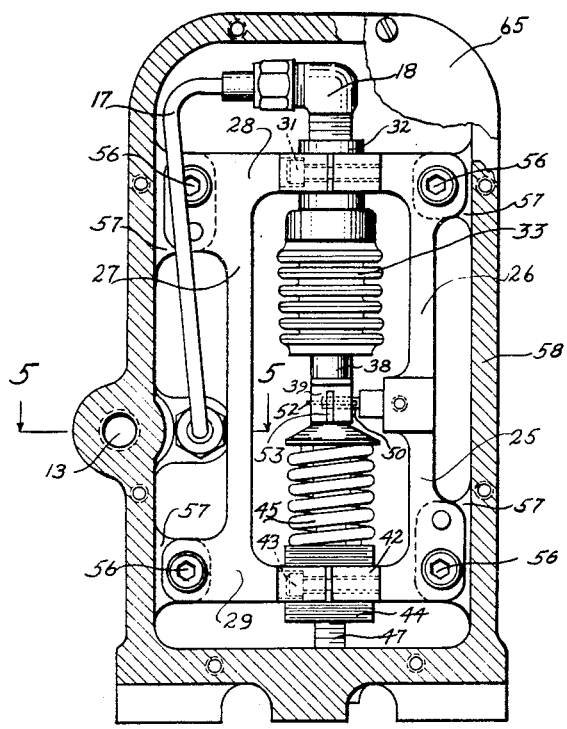
Figure 4 is a transverse sectional view taken through the rear of the indicator looking toward the front.
Figure 5:
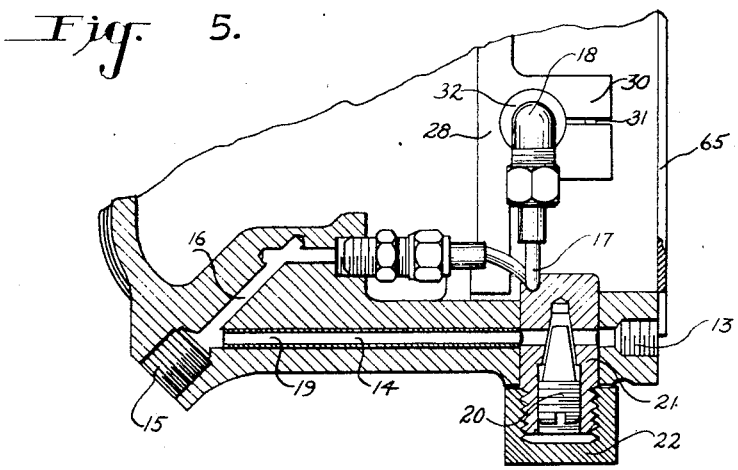
Figure 5 is a partial sectional view taken on the line 5—5 of Figure 4, certain parts being shown in top plan.

Referring first to Figure 1, the system comprises generally an air pressure supply line 1, tank 2, pressure reducing and regulating valves 3 and 4, an indicator 5 and a plug 6. The numeral 7 indicates a casting or other piece having a bore 8 to be measured. The tank 2 normally stands on end and serves to collect moisture in the air supply which may be released from time to time through a blow-off valve 9, normally positioned in the bottom of the tank. From the tank 2, the air passes to the first regulator valve 3 where in the present instance its pressure is reduced from the pressure in the line to approximately 50 pounds' gauge. The regulator valve 4 further reduces the pressure to approximately 40 pounds, at which pressure it is supplied by means of a pipe 10 to the indicator 5.

Means presently to be described are included in the indicator 5 for controlling the flow therethrough and to the plug 6 through the flexible tube 11. The plug 6 is of a size to fit loosely but with small clearance within the bore 8 to be measured and is provided with a pair of diametrically opposite orifices 12. When the plug 6 is placed within the bore 8 in the manner shown, the rate of escape of air from the orifices 12 depends upon

2 the size of the bore, and hence the diameter of the bore will determine the pressure present in the flexible hose 11. An air gauge of this type is very sensitive to small variations in the clearance between the orifices 12 and the walls of the bore and hence may be used not only to measure diameter, but variations in diameter, eccentricity and the like. The centering of the plug within the bore is not critical because whenever the air flow is obstructed through one of the orifices it is correspondingly increased through the opposite orifice. This type of gauge has great utility in routine shop inspection where a large number of pieces are to be gauged in the course of production and it is not desired to employ time consuming methods or to use apparatus which must be skillfully manipulated to give accurate results.

The indicator 5 is of a unique type in that it must be constructed to respond to very minute changes in pressure within a small range since this system is only used to measure rather fine tolerances. Referring now to the various sectional views in the drawing, the pipe 10 is adapted to be connected with the indicator at the fitting 13 which connects with an internal passage 14 leading to a fitting 15 for the flexible tube 11. A side channel 16 communicates with the passage 14 and transmits the pressure therein through a short pipe 17 to a fitting 18 connected with the pressure responsive mechanism. In the present embodiment, the channel 14 is provided with an internally smooth liner 19 and adjustable means are provided for regulating the air flow therethrough. The flow regulating means comprises a tapered plug 20 threadably mounted in a body 21 which may or may not be formed as an integral part of the indicator housing. A cap 22 is provided to cover the plug 20 after its adjustment.

The pressure responsive and indicating mechanism, including the fitting 18, is mounted in an open frame 25 secured by screws 56 to a plurality of lugs or ears 57 which are integral with walls 58 of the housing. The frame 25 comprises vertical legs 26 and 27 and interconnecting top and bottom rails 28 and 29. The top rail 28 is provided with a split lug 30 forming a clamp which may be tightened by means of a screw 31 upon a block 32 supporting a flexible metal bellows 33. The upper end of the bellows 33 is attached and sealed to the block 32 by means of a threaded fitting 34 and the block 32 is provided with a central channel 35 having side openings 36 and an end opening 37, this channel being in communication with the fitting 18 and the pipe 17.

The lower end of the bellows 33 is attached and sealed to a block 38 which is slightly spaced from the lower end of the block 32. The block 38 has a neck 39, a spring seat 40 and an abutment 41, all depending downwardly therefrom. The lower rail 29 has a split clamp 42 which may be tightened by a screw 43 to firmly grip an adjustable stationary spring seat 44. The spring seat 44 supports a spring 45 which exerts an upward force against the previously mentioned seat 40 on the block 38. The spring seat 44 is provided with a central opening 46 through which loosely passes an adjustable stop 47 having screw threaded engagement with a base wall 48 on the housing. A set screw 49 is provided to lock the adjustment of stop 47 after it is set, the upper end of the stop being slightly spaced from the abutment 41.

The side leg 26 of the frame 25 carries a fixed pivot 50 for an indicating arm 51 which is movable by a pin 52 passing through the neck 39 and an opening in the arm 51 slightly spaced from the pivot 50. The neck 39 is slotted at 53 to receive the end 54 of the arm therewithin. The other extremity 55 of the arm 51 is bent through 90° and moves in proximity to a window 60 having associated therewith suitable indexes and markings which may be calibrated to indicate internal diameters and tolerances in the work piece. Behind the window 60 is a mask 61 having a scale of markings thereon and having a central opening through which the end 55 of the indicating arm is visible. Along one side of the window is a guide 62 carrying a pair of slidable index markers 63 and 64 which may be set to indicate permissible undersize and oversize tolerances in the work piece. The casing may be closed on the rear by a cover plate 65.

In use in connection with a particular kind of work pieces, the mechanism is adjusted so that when the inside diameter is precisely correct the indicator bar 55 will lie on the midpoint of the scale. The sliding indexes 63 and 64 are then adjusted to correspond with the plus and minus permissible tolerances so that if the indicator bar 55 drops below the index 64 or above the index 63, the work piece is to be rejected. The position of the indicator bar anywhere between these two indexes indicates that the work piece is within permissible tolerances, and the coincidence of the bar 55 with the midpoint on the scale on the mask 61 indicates that the diameter being measured is precisely correct.

The mechanism is calibrated to function in the manner described by means of two separate adjustments. One of these adjustments is by way of the plug 20 which may be turned by a screwdriver to regulate the air flow through the passage 14, and the other adjustment is by way of rotating the spring seat 44 to adjust the effective force exerted by the spring 45. Thus the spring pressure may be coordinated with the rate of air flow to produce the proper indication on the scale. These two adjustments may be accomplished to produce a predetermined amount of indicator movement for different tolerances. For very close tolerances the plug 20 is preferably adjusted to reduce the air flow to a relatively small velocity, and for tolerances less close a higher rate of air flow is preferable. In this manner the rate of air flow may be adjusted to produce a full scale deflection for any particular tolerance range within the limits of the system, and the spring pressure may be adjusted to properly center the indicator movement on the scale. The inherent flexibility of the present system is enhanced by the fact that the indicating mechanism may, by means of these adjustments, be adapted to accommodate a variety of types of plugs 6 having different characteristics for different types of work.

Quickness of response is improved by filling, or nearly filling, the bellows 33 with oil or other fluid to reduce the amount of air in the system. Rugged stops are provided to prevent injury to the mechanism upon the sudden application or removal of the operating pressure. To this end the downward movement of the indicator bar 55 is limited by the abutment of the block 38 against the end of the block 32 when the operating pressure within the bellows is removed. Similarly, the adjustable stop 47 positively limits the upward swing of the indicator bar 55 and prevents injury to the bellows upon the application of excessive pressure.

The present construction provides an indicator which is sufficiently rugged to withstand a reasonable amount of rough handling without injury and which cannot be damaged by the sudden application or release of abnormal pressures. On the other hand, a relatively high degree of sensitivity is obtained and the indication is produced by a large sweep of the indicator bar which is easily interpreted by unskilled workmen without reference to units such as pounds per square inch or thousandths of an inch. In using the instrument, the operator need not know what the actual diameter of the work piece is or should be, or what the tolerances are in thousandths of an inch. His only requisite knowledge and ability to use the instrument is to be able to observe when the indicator bar 55 lies intermediate the two indexes 63 and 64 and when it lies beyond these limits or entirely off the scale. To even further avoid the possibility of error from ignorance or carelessness, the opening in the mask 61 may be made of such a size that the work piece is within allowable tolerances only when the bar 55 is visible. All the operator then need think about is to put the pieces in one pile when the bar 55 is visible in the window, and to reject the pieces when the bar 55 does not appear in the window.

Various changes may be made in the construction and arrangement, and all such modifications are deemed to be included in the invention, the same being limited only by the scope of the appended claims.

We claim:

1. In an indicator, an open rectangular frame comprising a pair of vertical legs and interconnecting upper and lower rails, said upper rail including a split clamp, a pressure responsive bellows fixedly secured in said clamp and disposed within said frame, an indicating arm pivotally mounted on a side leg of said frame, said bellows having a free end connected with said indicating arm to move same, the bottom rail of said frame comprising a split clamp carrying an adjustable coil spring seat, a spring on said spring seat opposing expansive movements of said bellows, and means for securing said frame within a housing.

2. An indicator comprising a housing, a hollow frame within said housing comprising a pair of side legs and top and bottom rails, a pressure responsive bellows carried by said top rail, an indicating arm pivotally mounted on one of said side legs, the lower end of said bellows being connected to said indicating arm for moving the latter, an adjustable spring seat carried by said lower rail, a coil spring on said spring seat for opposing expansive movements of said bellows, an opening through said spring seat, means for securing said frame in said housing, and a screw threaded adjustable stop mounted in said housing and extending through the opening in said spring seat to limit the expansive movement of said bellows.

3. In an air pressure gage, an indicator housing, an air passage in a wall of said housing, an air supply connection at one end of said passage, a plug gage connection at the other end of said passage, a hollow frame removably mounted in said housing, a pressure responsive expansible bellows carried within said frame and connected with said air passage, an indicating arm pivotally mounted in said frame and having an end movable by expansive movements of said bellows, a coil spring carried by said frame in alignment with said bellows for opposing said expansive movements, an abutment in said bellows to prevent collapse thereof under spring force, an abutment within said spring to limit the expansion of said bellows, said spring being loaded so that said indicating arm will give pressure indications only over a limited elevated range, an adjustable seat for regulating the loading of said spring to make the limits of said indicating range correspond to pressure variations occurring within predetermined gaging tolerances, and a valve in said passage for controlling the air flow therethrough to bring the pressure within the indicating range.

4. In an air pressure gauge, a hollow frame having vertical side legs and horizontal top and bottom rails, a pressure responsive bellows carried by said top rail and adapted to receive liquid, a pressure line communicating with the space in said bellows above said liquid, an indicating arm pivoted on one of said side legs, said bellows having a movable end connected with said indicating arm, a coil spring opposing expansive movement of said bellows, a pair of abutments within said bellows to prevent collapse thereof, a pair of abutments adjustable relative to each other within said spring to limit the expansion of said bellows, and an adjustable seat for said spring carried by the lower rail of said frame.

5. In an air pressure gauge, a hollow frame having vertical side legs and horizontal top and bottom rails, a pressure responsive bellows carried by said top rail, an indicating arm pivoted on one of said side legs, said bellows having a movable end connected with said indicating arm, a coil spring opposing expansive movement of said bellows, a pair of abutments within said bellows to prevent collapse thereof, a pair of abutments adjustable relative to each other within said spring to limit the expansion of said bellows, an adjustable seat for said spring carried by the lower rail of said frame, a housing, means at the corners of said frame for securing said frame within said housing, an air pressure line leading through the wall of said housing to said bellows.

LYSLE D. CAHILL.
VICTOR T. UBER.

REFERENCES CITED

The following references are of record in the file of this patent:

UNITED STATES PATENTS

| Number | Name | Date |
| --- | --- | --- |
| 867,942 | Bobrick | Oct. 15, 1907 |
| 1,187,334 | Keppler | June 13, 1916 |
| 1,220,972 | Fulton | Mar. 27, 1917 |
| 1,475,252 | Swanjord | Nov. 27, 1923 |
| 1,621,320 | Griffin | Mar. 15, 1927 |
| 1,723,548 | Heise | Aug. 7, 1929 |
| 1,925,301 | Campbell | Sept. 5, 1933 |
| 2,038,928 | Farley et al. | Apr. 28, 1936 |
| 2,044,005 | Klein et al. | June 16, 1936 |
| 2,057,576 | Johnson | Oct. 13, 1936 |
| 2,072,617 | Cate | Mar. 2, 1937 |
| 2,139,282 | Poock | Dec. 6, 1938 |
| 2,247,089 | Hopkins | June 24, 1941 |
| 2,254,259 | Aller | Sept. 2, 1941 |
| 2,284,588 | Rineer | May 26, 1942 |

FOREIGN PATENTS

| Number | Country | Date |
| --- | --- | --- |
| 501,674 | France | Feb. 2, 1920 |
| 641,894 | France | May 1, 1928 |